8261X

R. WINANS.

Car Spring.

Patented June 14, 1834.

Ar. 15

June 14. 1834

Ross Winans
Letters Patent

8261X

June 14. 1834. —

The Schedule referred to in these Letters Patent and making part of the same
containing a description in the words of the said Ross Winans himself of his
Improvement in the mode of constructing Springs to rail road cars

---

Figure 1:
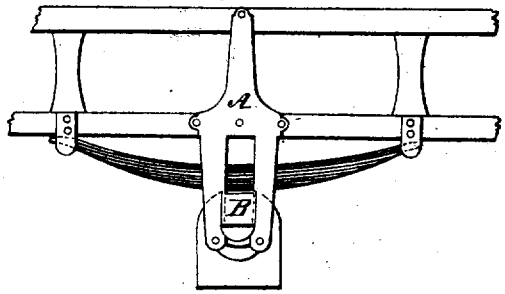
Figure 2:
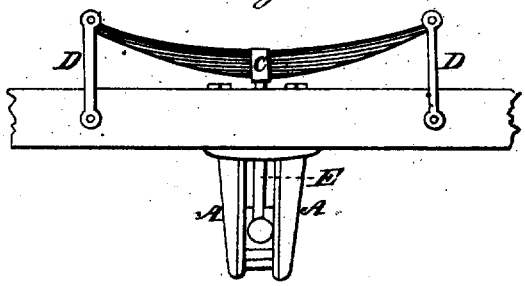
Figure 3:
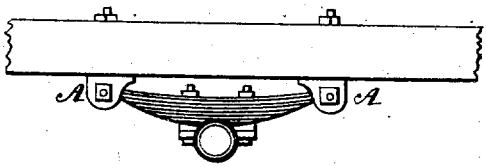
Figure 4:
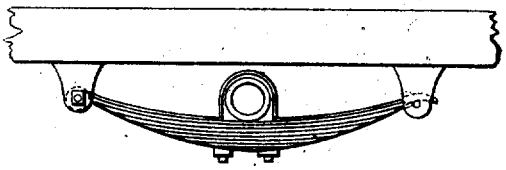
Figure 6:
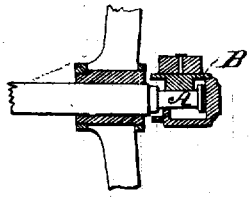
Figure 5:
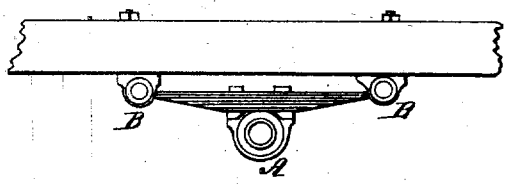

To all whom it may concern. Be it known that I Ross Winans of the city
of Baltimore in the State of Maryland. Civil Engineer have invented a
new and useful improvement in the mode of constructing springs for railroad
cars and that the following is a full and exact description thereof. reference
being had to the accompanying drawings which make a part of this speci
fication. The more perfectly to set forth the nature of my improvement
I will first briefly describe the construction of those springs. which have been
most generally used for rail road cars both in this country and in Eng-
land. A. fig. 1 represents a plate of cast or wrought iron which is bolted onto
the outside of the side rail of a car and sometimes on both sides of each side
rail. a pair of such plates being occasionally used. The parallel sides of these
plates serve as guides to the box. B. which receives the axle and allows it to
follow the motion of the spring and at the same time checks its tendency to
lateral or longitudinal deviation. The spring is placed above the box in the man-
ner shown in the drawing, its ends bearing upon plates on the under part of
the side rail. these springs are generally made from 30 to 35 inches in length
from 2¼ to 3 ½ inches deep in the centre the plates being from 3 to 3¼ inches
broad. In Fig. 2, A. is a cast or wrought iron frame bolted on to the low-
er side of the rail of the car. the box of the axle sliding in it as in the former case
The spring C. is placed above the rail its ends being attached to links
D.D. by means of bolts passing through them and through eyes formed in the
ends of the springs by scrolling or bending them round. A vertical bolt E
extends from the upper side of the box of the axle to the lower side of the spring.
These springs do not differ from the former in their general dimensions.
The great expense of springs so constructed has induced the formation of other
plans for making them by which it was hoped the intended object would be
produced Pd.

produced at a diminished cost. One kind of these springs is shown at fig 3.
These have been usually made about 24 inches long 2 1/4 inches deep and
about 2 3/4 broad scrolled or bent round at one or both ends the scrolls being
attached by bolts to iron castings A. A. bolted on to the underside of the
side rail. When one end only is scrolled the other slides in a mortise or pock-
et in one of the castings, the bearing box for the axle is bolted on to the lower
side of the spring. To these springs the following practical objections exist
the scroll or scrolls on their end tend to diminish their elasticity and they
do not sufficiently resist the effect of lateral movement or thrust, but are
liable to become loosened or deranged. That represented in fig 4. resembles
the one last described as will be seen by inspection. the bearing box however
is bolted on to the upper side of the spring and is held in its place by means
of an iron stirrup or strap which passes over it. this without obviating the ob-
jections to the one last named, causes the car to be hung inconveniently
low. The object which I profess to have attained is the furnishing a
spring which shall answer all the purposes of those first described whilst
from their greater simplicity they shall be much less expensive, and be at
the same time free from the objections which exist against the two latter
kinds. The spring as I construct it is shown at figure 5 and and in its
general appearance bears a resemblance to that of fig. 3. but differs from
it in several points which I deem of essential importance, instead of using
plates of the usual breadth I take them from 4 to 4 1/2 inch broad using a
a diminished number in proportion to the strength obtained from their
width, instead of giving a considerable curvature to these plates lengthwise
I make them very nearly straight bending them so much only as I think
necessary to allow of their being brought straight or nearly so by the load
which they are to sustain. The box A. for the axle is bolted on to the lower
side of the spring as in fig 3. the bolts used being [illegible] fitted to holes in the
centre line of the plates serve to keep them in their places without the aid
of the slots and studs generally employed to check the ends of such springs.
[illegible] by avoiding unnecessary thickness in the bearing box bring the journal
of the axle as near to the lower side of the spring as can be safely done in or-
der that a line joining the end bearings of the spring and the centre of the
axle axle may approach as nearly as possible to a straight one by this means I
almost annihilate the tendency to twist the spring by the lateral pressure of
the axle the great width of the spring and its straightness also aid in a very
high degree in sustaining it against this pressure. I do not form a scroll
or eye on either end of the spring but allow each to pass into a pocket or
mortise in the metal bearings B.B. usually of cast iron and bolted to the un-
der side of the side rail of the car. These pockets need be no deeper than is necess-
ary to admit the spring as there is scarcely any sensible difference in its
length when loaded or not. it therefore sustains the longitudinal thrust
without play which is not the case with a curved spring. They also fit
it closely in width and thickness and thus check its tendency to twist.
The dimensions of these springs must vary according to circumstances but
for a car intended to carry 3 tons the following I consider as in good propor-
tion. Length 37 inches breadth 4 inches. middle thickness 2¼ inches, plates
9 in number each one fourth of an inch thick in the middle and excepting
the two upper ones tapered towards their ends and diminishing in length
in the usual way. The journals of the axle when my spring is used must be
made with a button or knob as shown at A. fig 6. this has been generally
done when the springs shown in figs 1 & 2. have been employed and is always
advantageous as it divides the lateral thrust between the two sides of the car
by affording a shoulder on each side of the box B. whilst the spring which
I have described as my invention is equally efficient with those shown in
figs 1 & 2 and is free from the objections of those of fig. 3 & 4. they can be afford-
ed at about one half the price of the former owing to diminished quantity
of the material used in making them. but more especially to the great sav-
ing of labour in their construction from causes which will be obvious to ev-
ery competent workman. What I claim as my invention is the general con-
struction of the within described spring as resulting from the employment of plates
of steel of much greater width than has heretofore employed for the springs of rail road
cars and from the making of those plates straight or nearly so thereby preventing
any sensible alteration in their length when in action. and admitting of their ends
being both inserted in pockets formed in comparatively light bearing pieces Witnesses John H.B. Latrobe } Ross Winans.
J. Knight } Drawing Exd AJW.

12 60 [illegible]